United States Patent [19]

Galand et al.

[11] Patent Number: 4,479,213
[45] Date of Patent: Oct. 23, 1984

[54] TRANSMISSION METHOD FOR TRANSMITTING VOICE AND DATA INFORMATION OVER TELEPHONE LINE AND DEVICE FOR IMPLEMENTING SAID METHOD

[75] Inventors: Claude Galand, Cagnes; Henri Nussbaumer, LaGaude, both of France

[73] Assignee: International Business Machines Corp., Armonk, N.Y.

[21] Appl. No.: 399,935

[22] Filed: Jul. 19, 1982

[30] Foreign Application Priority Data

Jul. 28, 1981 [EP] European Pat. Off. ........ 81430024.0

[51] Int. Cl.³ .............................................. H04J 3/00
[52] U.S. Cl. .................................. 370/118; 370/110.1
[58] Field of Search .................... 370/118, 110.1, 111, 370/70

[56] References Cited

U.S. PATENT DOCUMENTS 3,991,277 11/1976 Hirata ..................................... 370/70

FOREIGN PATENT DOCUMENTS 2998 7/1979 France ................................. 370/118

Primary Examiner—Douglas W. Olms
Assistant Examiner—Frank M. Scutch, III
Attorney, Agent, or Firm—John B. Frisone

[57] ABSTRACT

The method allows voice and data information to be concentrated over a reduced number of telephone lines. It consists mainly in processing each voice signal to extract therefrom a so-called analog base band signal and digitally coded characteristic parameters. Said parameters are then multiplexed with pure data and submitted to a modulation operation. The analog signal resulting from the modulation is then added to the base band before being transmitted over a telephone line.

13 Claims, 19 Drawing Figures

TRANSMISSION METHOD FOR TRANSMITTING VOICE AND DATA INFORMATION OVER TELEPHONE LINE AND DEVICE FOR IMPLEMENTING SAID METHOD

DESCRIPTION

The present invention relates to the speech signal transmission and more particularly to the simultaneous transmission of speech and data signals over telephone lines.

BACKGROUND ART

The high cost of transmission paths is the reason for looking for compression means that allow signals from several different sources to be sent over the same path. Thus, techniques have been developed for concentrating speech-originating signals and data on the same line. Some of these techniques use the silent intervals of the speech for transmitting data; others remove artificially a frequency band in the speech signal spectrum to insert the data. The means for implementing these techniques do not permit presently obtaining a satisfactory quality/price ratio.

On the other hand, the cost of digital signal processing devices is at present relatively low, and the tendency is to develop entirely digital speech compression techniques. Thus, to transmit simultaneously several speech signals over a telephone line, vocoders (voice coders) with a low bit rate (2400 to 4800 bps) have been used with their outputs being digitally multiplexed over the same telephone line equipped with modems operating at 4800 or 9600 bps. However, the low bit rate vocoders used are often based on techniques requiring measurement of the fundamental (pitch) frequency. The hazards of this measurement considerably reduce the quality of the transmitted speech.

SUMMARY OF THE INVENTION

One of the objects of the present invention is to provide a method for concentrating on the same telephone line at least one speech signal and pure data with a better quality/price ratio.

Another object of the present invention is to permit transmission over a number n of telephone lines of speech-originating signals and of data originating from a number of sources N higher than n.

More precisely, the invention relates to a method for ensuring simultaneous transmission of speech signals and of pure data over a telephone line using speech processing techniques according to which the speech originating electrical signal contained in the low-frequency band (so-called base band) is separated from the remainder of the speech signal, this method being characterized in that the base band is transmitted in analog form on the transmission line, whereas the characteristic parameters of the speech contained in the high-frequency band are digitally coded and multiplexed with the pure data to be transmitted before being submitted to a modulation operation and then fed to said transmission line. The expression pure data is used therein to designate digitally encoded data, e.g., data provided by a digital terminal.

The foregoing and other objects, features and advantages of the invention will be apparent from the following, more particular description of a preferred embodiment of the invention, as illustrated in the accompanying drawings.

DETAILED DESCRIPTION OF THE INVENTION

Figure 2:
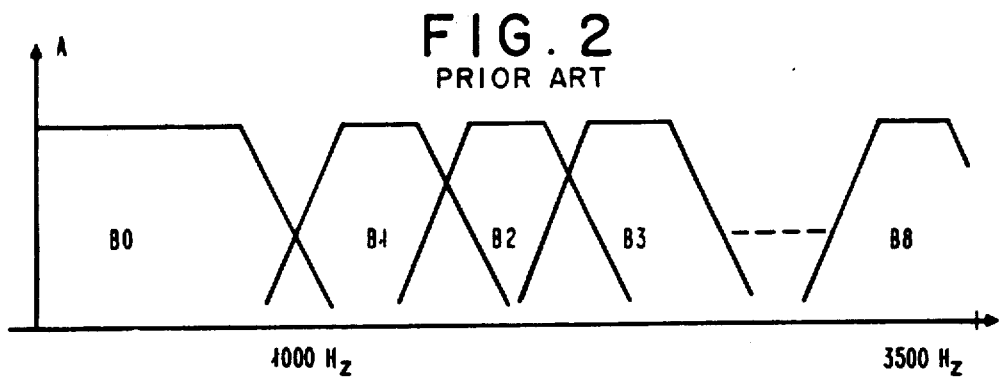
FIG. 2 illustrates a frequency diagram associated with the device of FIG. 1.
Figure 1:
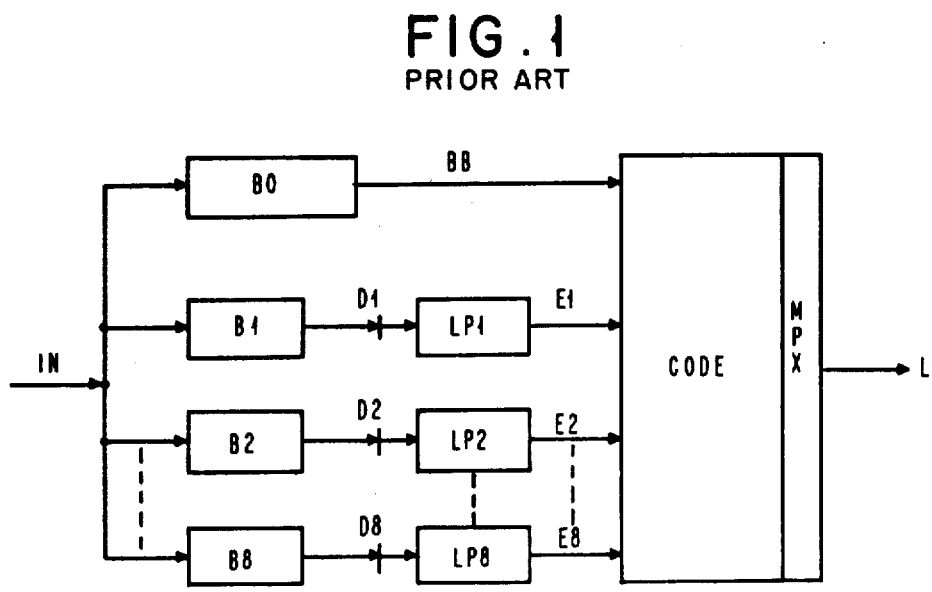
FIG. 1 illustrates a circuit diagram of a speech emitter of the prior art.

FIG. 1 represents the circuit diagram of a conventional voice coder (vocoder) of the so-called Voice-Excited Vocoder (VEV) type. The speech signal to be coded is applied to input IN of the device. It then passes through a certain number of filters comprising on the one hand a low-pass filter B0 (for example 0–1000 Hz) and on the other hand a bank of band-pass filters B1 to B8, each one covering a high-frequency (HF) channel. The juxtaposition of said HF channels (or subbands) covers a frequency range of the speech signal from about 1000 Hz to 3500 Hz (see FIG. 2). The low-pass filter B0 extracts a low-frequency band, the so-called base band (BB), from the speech signal appearing at IN. The output of each of the low-pass filters B1 to B8 passes through a rectifier D1 to D8 and a low-pass filter LP1 to LP8. Thus, at the output of filters LP1 to LP8 appear data E1 to E8 relative to the energy contained in each of the bands B1 to B8 (HF channels). After digital conversion and coding in CODE, the base band of the speech signal and the data E1 to E8 are, in principle, multiplexed in MPX and transmitted over a transmission path L.

Figure 3:
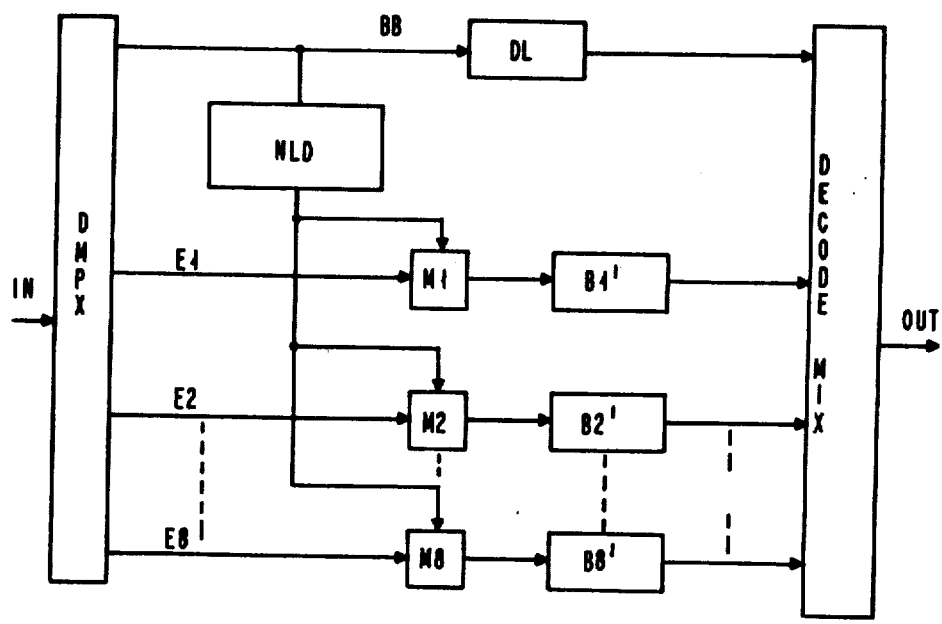
FIG. 3 illustrates the diagram of a speech receiver of the prior art.

FIG. 3 represents a diagram of the receiver placed at the other end of transmission path L. A demultiplexer DMPX separates the different informations from each other, that is, the base band and the energy of each HF channel. The base band is fed into a delay line DL and also into a non-linear distortion generator NLD. The operation performed in the NLD expands the spectrum of the base band to provide a so-called excitation information to a series of modulators M1 to M8. Each of said modulators receives furthermore one of the energy informations E1, E2, . . . , or E8. The outputs of the modulators M1 to M8 are filtered by filters B1' to B8' respectively, similar to the band-pass filters B1 to B8.

The information issued by DL and B1' to B8' are decoded and mixed in DECODE MIX to restore the original speech signal.

The preceding summary relates to conventional devices which are extensively described, especially in a publication by James L. Flanagan entitled: 'Speech Analysis, Synthesis and Perception' published in 1965 by Editions Springer-Verlag, Berlin, Heidelberg, N.Y.

Figure 4:
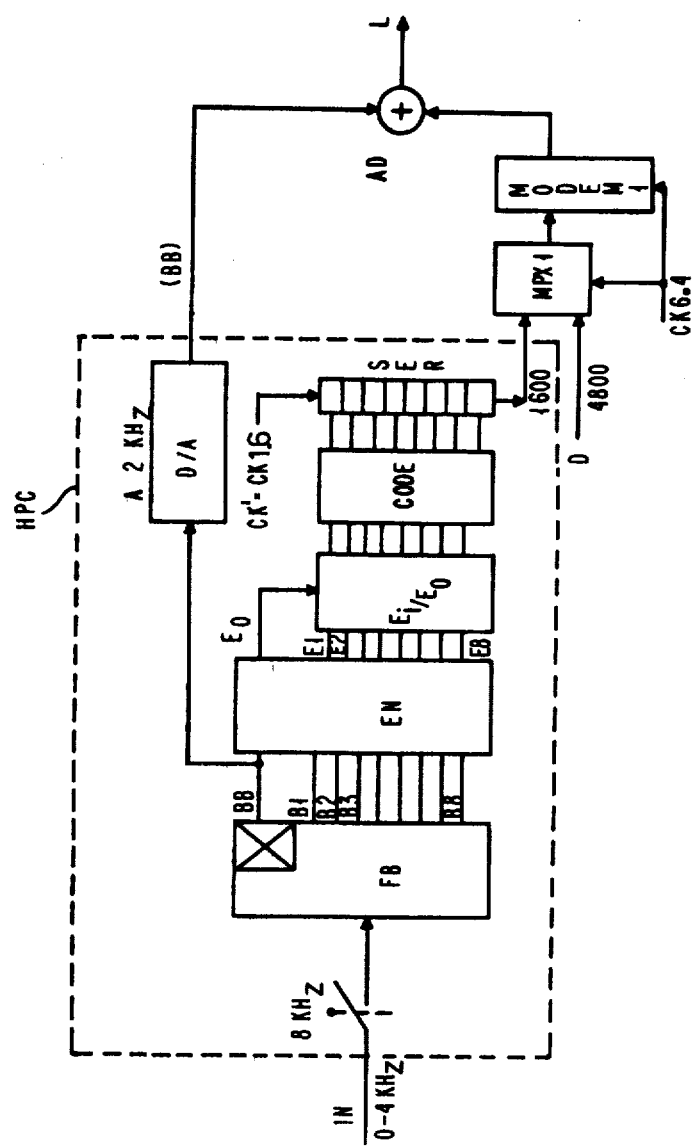
FIG. 4 illustrates a diagram of an emitter device implementing the invention.

FIG. 4 represents the circuit diagram of an emitter device for transmission of voice and data according to the invention using in particular the VEV-type techniques mentioned above.

However, it should be noted that the base band is transmitted in analog form on line L without undergoing any particular processing, whereas the data relative to the energies of the HF voice channels is multiplexed with the data (D) before its analog transformation (in modem 1) and added to the base band for transmission over line L.

FIG. 4 represents an embodiment of the invention. The speech signal in the so-called telephone (for example roughly 0–4000 Hz) is sampled at its Nyquist frequency (8 KHz). It is then submitted to a filter bank covering the base band (subband BB) and HF subbands according to the distribution of the following Table 1.

TABLE I

| | Bandwidth | Number of Samples by Band over 20 ms |
|---|---|---|
| Base band Subband BB Channels | 0.250 to 0.750 KHz | 20 |
| (Subbands) HF | | |
| B1 | 0.750 to 1 KHz | 10 |
| B2 | 1 to 1.25 KHz | 10 |
| B3 | 1.25 to 1.50 KHz | 10 |
| B4 | 1.5 to 1.75 KHz | 10 |
| B5 | 1.75 to 2 KHz | 10 |
| B6 | 2 to 2.5 KHz | 20 |
| B7 | 2.5 to 3 KHz | 20 |
| B8 | 3 to 3.5 KHz | 20 |

The filter bank FB is of the known type (specified hereafter) which, in addition to filtering properly speaking, performs a so-called decimation operations. Thus, for each 20 ms speech signal segment sampled at 8 KHz (that is, 160 samples) appearing at the input of filter FB, there should be total of 160 samples over the FB outputs for the same 20 ms time interval. These samples will be distributed as indicated in the righthand column of the table. Ten samples of the subband 0–0,250 KHz and 20 samples of the subband 3,5–4 KHz should be added. But in the present case, it has been decided not to use these two subbands. If the samples of a given subband are designated by $X_j^i$ where $i=1, 2, \ldots, 8$ represents the rank of the considered subband at the output of filter bank FB, and where $j=1, 2, \ldots, p$ represents the rank of the considered sample in a given 20 ms speech segment, then p=20 for subbands B0, B6, B7 and B8, and p=10 for subbands B1, B2, B3, B4 and B5.

The base band BB and subbands B1 to B8 are processed to extract therefrom information relative to the energies of the signals they contain. More particularly, the ratios between the energies over 20 ms time slots of the HF subbands and of the base band are of interest. The subbands BB and B1 to B8 are thus fed to a device EN that calculates the energy Ei ($i=0, 1, \ldots, 8$) of each subband from the relation:

$$E_i = \sqrt{\sum_{j=1}^{\ell} (X_j^i)^2} \quad (1)$$

Figure 5:
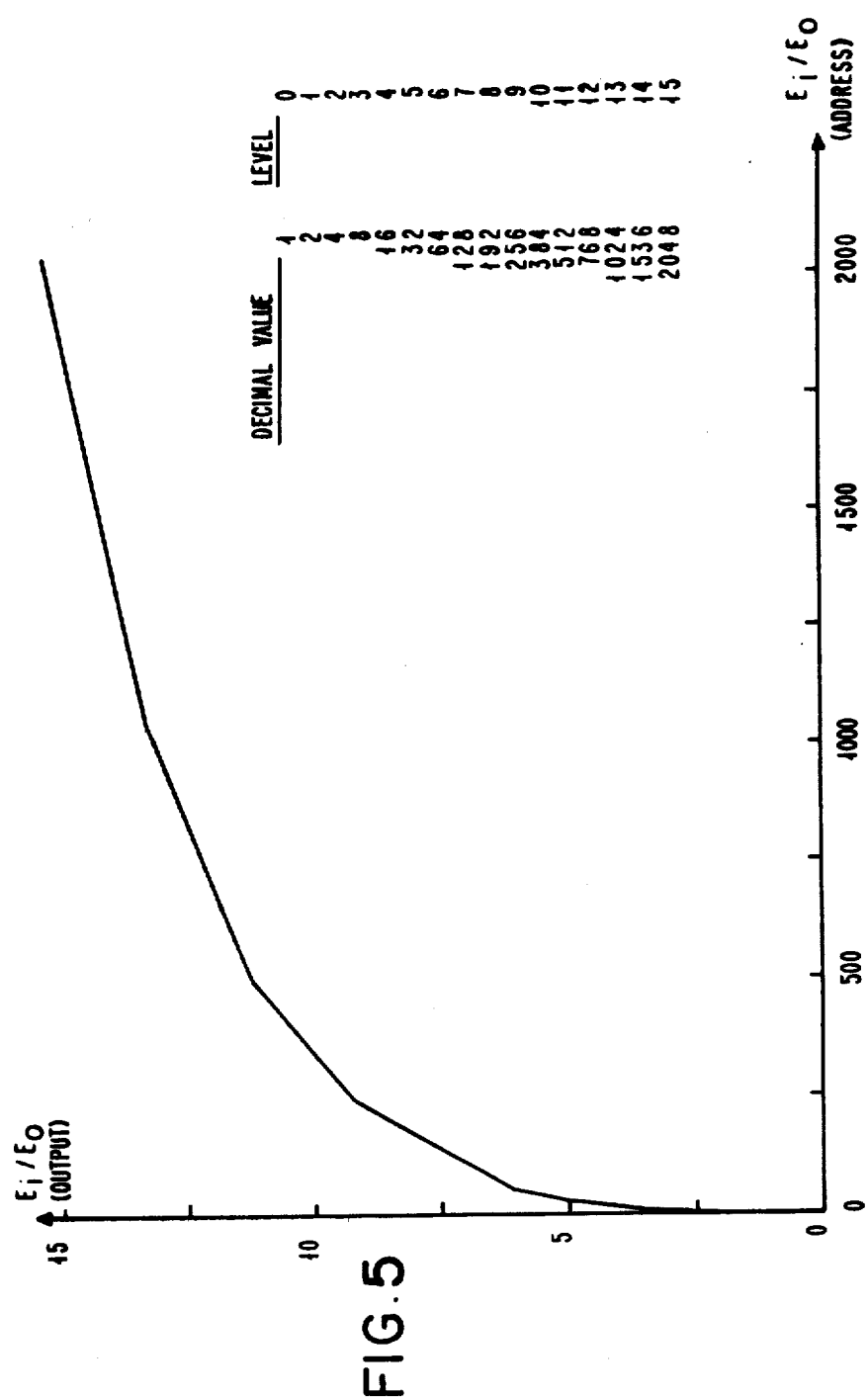
FIG. 5 illustrates a coding diagram used in the device of FIG. 4.

A device Ei/Eo then computes the ratio between the energy of each HF channel and the energy (Eo) of the base band. In other words, the energy of the HF subband is normalized with respect to the energy of the base band in an energy normalizing device (Ei/Eo). The output of device Ei/Eo, provides eight parameters translating the normalized 12-bit coded energies. This energy data is transcoded into CODE into 4-bit words. The transcoding operation can use a logarithmic scale table (see FIG. 5) which, when addressed by 12-bit words, provides 4-bit words output. For example, if Ei/Eo=60 indecimal code, it is coded with 12 bits as 000000111100. For transcoding, the decimal value nearest to 60 is 64, that is, level six of the table, and it is represented with four bits by 0110. The 4-bit transcoded words are fed into a serializer SER which can be unloaded at the rate of:

$$\frac{8 \times 4}{20 \times 10^{-3}} = 1600 \text{ bps}$$

The 1600 bps supplied by SER can then be multiplexed in MPX1 with pure data (D) which are provided at a rate of 4800 bps to supply a bit train of 6400 bps.

Figure 6:
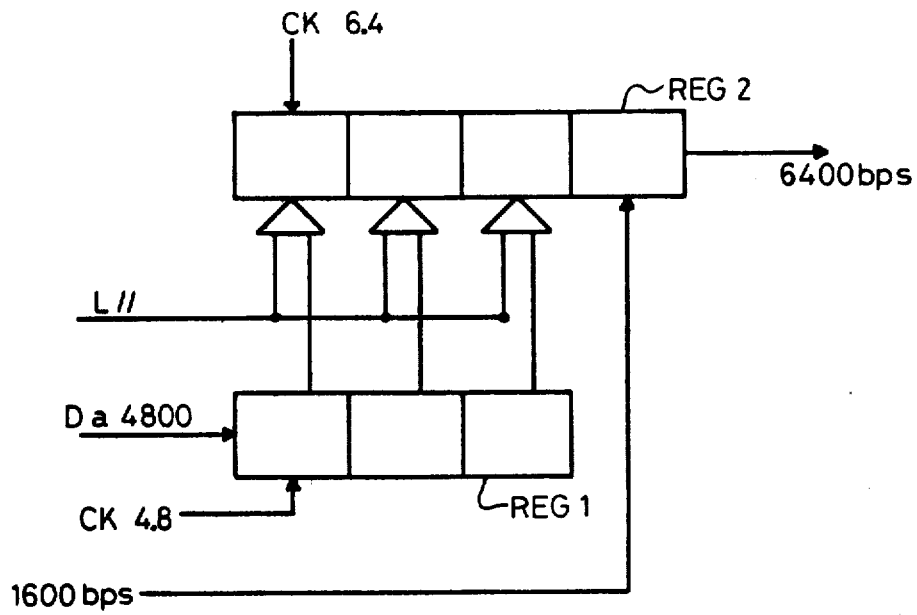
FIGS. 6 to 9 illustrate detailed elements of the device according to FIG. 4.
Figure 7:
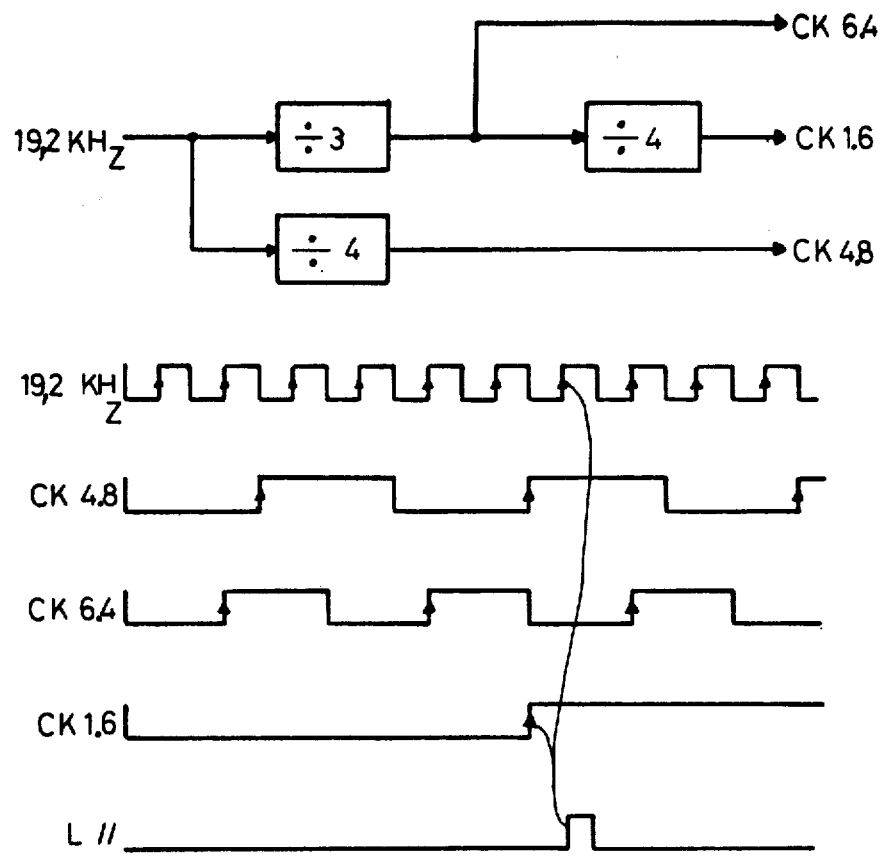

The diagram of multiplexer MPX1 is illustrated in FIG. 6. A first register REG1 controlled by a clock CK 4.8 (4.8 meaning 4.8 KHz) is used to deserialize the pure data, for instance, the data provided by a terminal (not shown). Register REG1 is unloaded into a register REG2 under control of a synchronization signal designated by L//. Register REG2 furthermore has a position for the 1600 bps data relative to the ratios Ei/Eo relative to the characteristic parameters of the speech signal. Register REG2 is unloaded in series at the rate of 6400 bps under control of clock CK 6.4. A common clock at 19200 Hz as illustrated in FIG. 7 is used for synchronizing the various clock signals to be used here.

The data at 6400 bps provided by REG2 are transmitted to a modem (MODEM1) which can be of the IBM 3865 type. Transmission will be at 1600 bands (by grouping the bits to be transmitted in quad bits) with a 2000 Hz carrier and a 3 dB bandpass which extends between 1200 and 2800 Hz.

Figure 8:
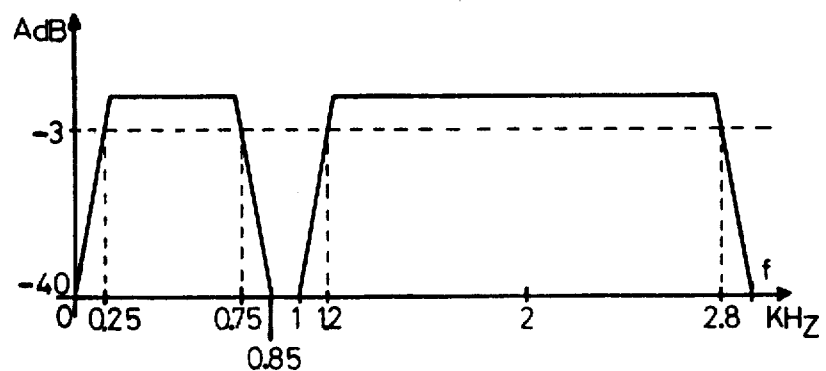

The output signal of the modem is added in A/D to the base band before being transmitted to the telephone line L. FIG. 8 illustrates the frequency spectrum of the signal transmitted over the line L. The spectrum is composed of a frequency band from 0.250 to 0.750 KHz containing the speech signal and of a frequency band from 1.2 to 2.8 KHz occupied by the data provided by MODEM1.

Thus, the device of FIG. 4 allows the transmission over the same telephone line of a speech signal and of pure data. The transmission device comprises essentially an arrangement designated as HPC, grouping means for processing the speech signal to extract therefrom on the one hand an analog base band signal and on the other hand a set of characteristic speech parameters. The parameters are then multiplexed with pure data and submitted to a modulation operation before being added to the base band and transmitted over the line.

Figure 9:
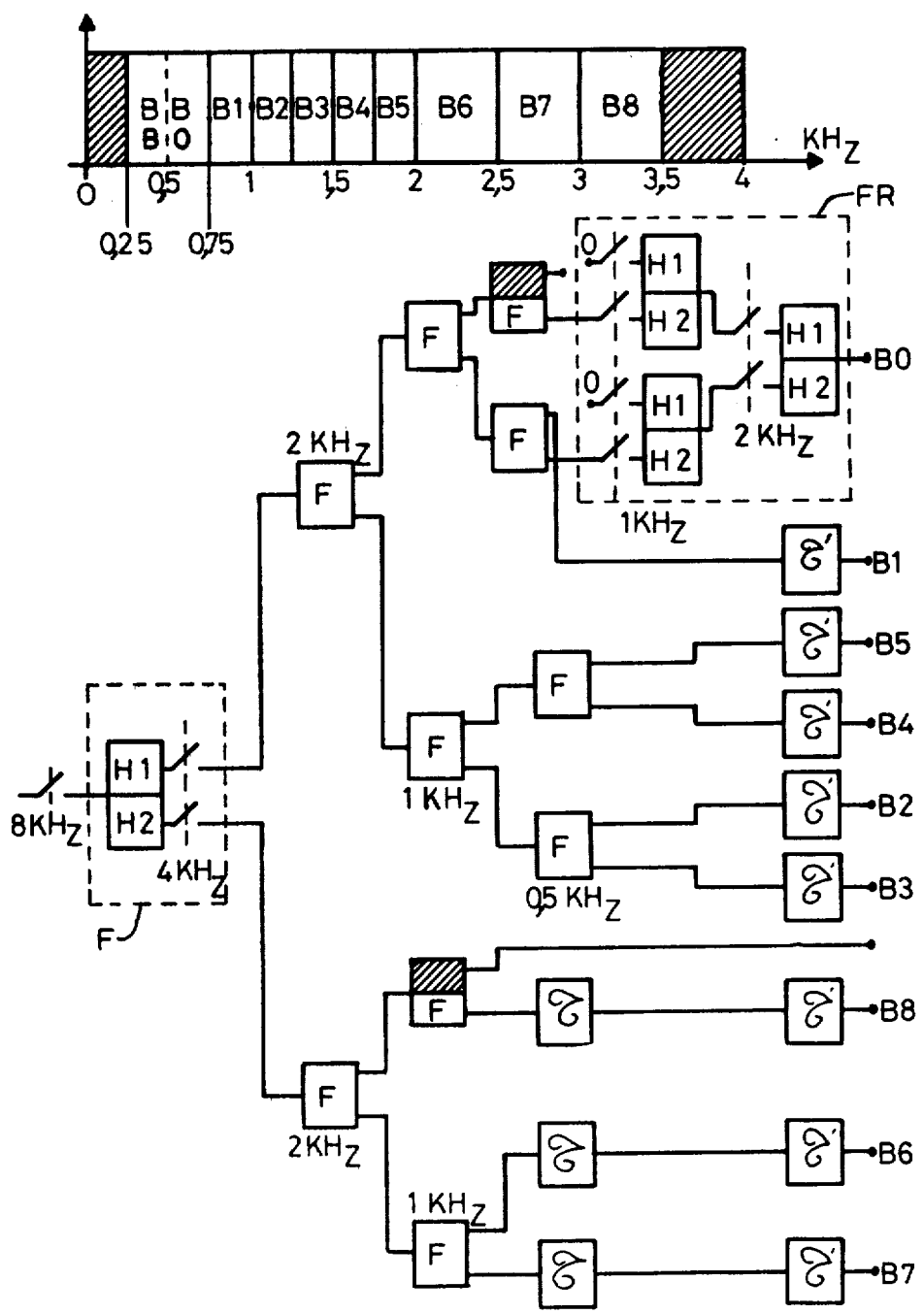

FIG. 9 illustrates an embodiment of the filter bank FB using the filtering and decimation techniques described in U.S. Pat. No. 4,142,071 to the applicant (see FIGS. 4 and 5 of said patent) and in an article presented by D. Esteban and C. Galand at the International Congress of Acoustics in Madrid 1977 and entitled: 'Direct Approach to Perfect Decomposition of Speech in Sub-Bands'. Reference can also be made to the publication IBM Technical Disclosure Bulletin, vol. 19, No 9, February 1977, pages 3438-39. Accordingly, the filter bank FB is based on a tree structure where each level is composed of elements F each comprising two halfband filters (one low-pass filter H1 and one high-pass filter H2) and decimation switches. Each switch is activated at a frequency which is half the frequency at which the samples enter the corresponding element F. This so-called decimation operation which corresponds to resampling each filtered signal at the Nyquist frequency allows maintaining the volume of information constant throughout the tree. On the other hand, the original signal is recombined from the subbands by using a symmetrical filter (see FIG. 4 of the mentioned above U.S. patent) in which the switches perform a so-called interpolation operation (insertion of a zero valued sample between two consecutive samples) so that the sampling frequency of the signal can be restored to its initial value. With this in mind, it is easy to understand the diagram of FIG. 9 which represents the filter FB used in the speech and data transmission device of FIG. 4. FIG. 9 illustrates a diagram of filter FB and a simplified representation of the filtering diagram in the frequency domain. This diagram shows that the base band comprises two parts which must therefore be recombined to obtain the base band BB. On the other hand, the unused subbands of the diagram in FIG. 9 are hatched. The diagram of filter FB comprises first three similar stages at the end of which the sampling frequency is reduced from 8 KHz to 1 KHz. The fourth stage comprises a part continuing the tree by means of elements F to supply the subbands BB (in two half subbands), B1, B5, B4, B2 and B3, and a part supplying the subbands B8, B6 and B7 directly. The recombination of the two half subbands of B0 takes place in FR and uses the interpolation techniques mentioned above. It is to be noted that delay elements $\tau$ and $\tau'$ have been added. Elements $\tau$ compensate for the delays due to the fourth stage of elements F, whereas elements $\tau'$ compensate for the delays due to FR. It is also to be noted that the outputs which would have supplied the unused bands are hatched.

Figure 10:
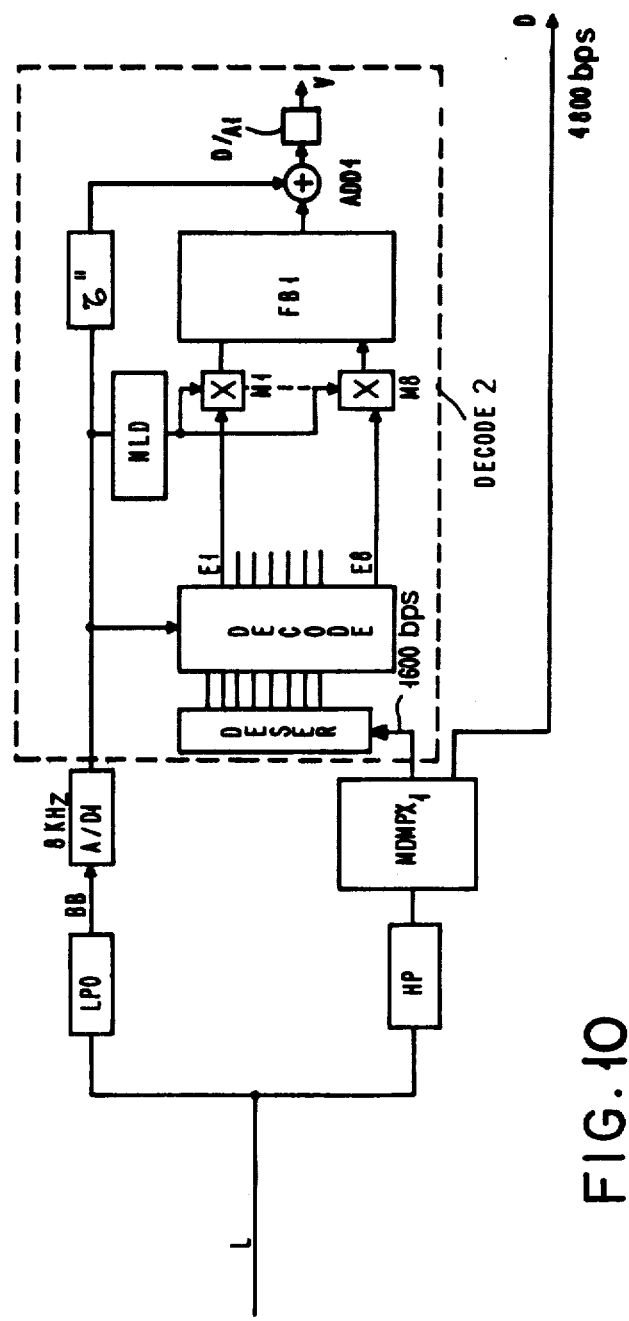
FIG. 10 illustrates a diagram of a receiver device according to the invention as implemented according to the diagram of FIG. 4.

FIG. 10 illustrates the diagram of the circuit placed at the end of line L for reconstructing the original speech and data information. The received signal is filtered in LP0 and HP so as to separate base band BB from the signal transmitted by MODEM1. The characteristics of these filters are thus defined according to the diagram of FIG. 8. The high band (1.2 to 2.8 KHz) provided by HP is transmitted to a modem demultiplexer MDMPX1. The modem and demultiplexer of MDMPX1 are symmetrical with those of FIGS. 4, 6 and 7. They supply on the one hand pure data (D) at 4800 bps and on the other hand data at 1600 bps relative to the energies of the high frequency band of the speech signal normalized by the base band BB energy. Deserialization of said 1600 bps in DESER separates from each other the data Ei/Eo for i=1, 2, ..., 8. This 4-bit coded data is processed in DECODE where a 4-bit to 12-bit transcoding takes place according to a rule which is inverse to the logarithmic rule of FIG. 5. The 4-to-12-bit conversion can also be performed by table reading. The base band signal provided by LP0 is sampled at 8 KHz and 12-bit coded in A/D1. The base band signal provided by A/D1 is transmitted to DECODE where it is first 'decimated' by taking one sample out of 4 to be down sampled to 2 KHz. It is then processed to compute energy Eo of the base band over 20 ms time slots. This energy is used in DECODE to multiply the information supplied by each of the outputs of deserializer DESER. This operation of renormalizing energies HF by Eo is necessary because the transmission of the base band—in analog mode—cannot be performed at unitary gain. Data E1 to E8 are thus obtained at the output of DECODE. Data E1 to E8 modulate in M1 and M8 the base band whose frequency is extended by the non-linear distortion device NLD (see also FIG. 3). The outputs of modulators M1 to M8 are transmitted to a device FB1. In FB1, each output of modulators M1 to M8 is first filtered by band pass filters whose bandwidths are defined with respect to Table 1. The outputs of these filters are then recombined using interpolation and filtering derived from the device of FIG. 9 by symmetry (see also FIG. 4 of the mentioned above U.S. patent). The output of FB1 is added in ADD1 to the base band provided by A/D1 and delayed by $\tau''$. $\tau''$ is to compensate the delays due to the processing of subbands HF in MDMPX1 and FB1. The data from ADD1 must then be converted into analog form in D/A1 to reconstruct the speech signal originally transmitted over the line L.

While the invention described so far applies to base band vocoders including an analysis of the high-frequency band by a filter bank, it will be understood that it can also be applied to other types of vocoders which permit isolating part of the the speech signal information (for example the base band) whereas the remainder of said information, i.e. characteristic speech parameters would undergo digital coding enabling their multiplexing with pure data before analog conversion, mixing with the base band and line transmission. The vocoders using the so-called linear prediction techniques are part of this category.

A linear prediction vocoder has been described in the U.S. Pat. No. 4,216,354.

The method, described in the U.S. Pat. No. 4,216,354, decomposes the information relative to the speech signal into three different parts designated respectively by ENERG, SIGNAL and COEF. SIGNAL contains the data relative to the low-frequency band (base band) of the speech signal. ENERG translates the energy information contained in the high-frequency part of the telephone band. COEF represents so-called partial correlation (or reflection) coefficients derived from the speech signal. The implementation of the device described in U.S. Pat. No. 4,216,354 showed that about 70% of the coding bits were to be reserved for SIGNAL, whereas ENERG and COEF needed only the remaining 30%. Consequently, the speech coding method of U.S. Pat. No. 4,216,354 is a perfect candidate for the transmission method according to the present invention. For that purpose, the base band (SIGNAL) is to be maintained in analog form, and only ENERG and COEF are to be digitally coded and could be possibly multiplexed with pure data.

Figure 11:
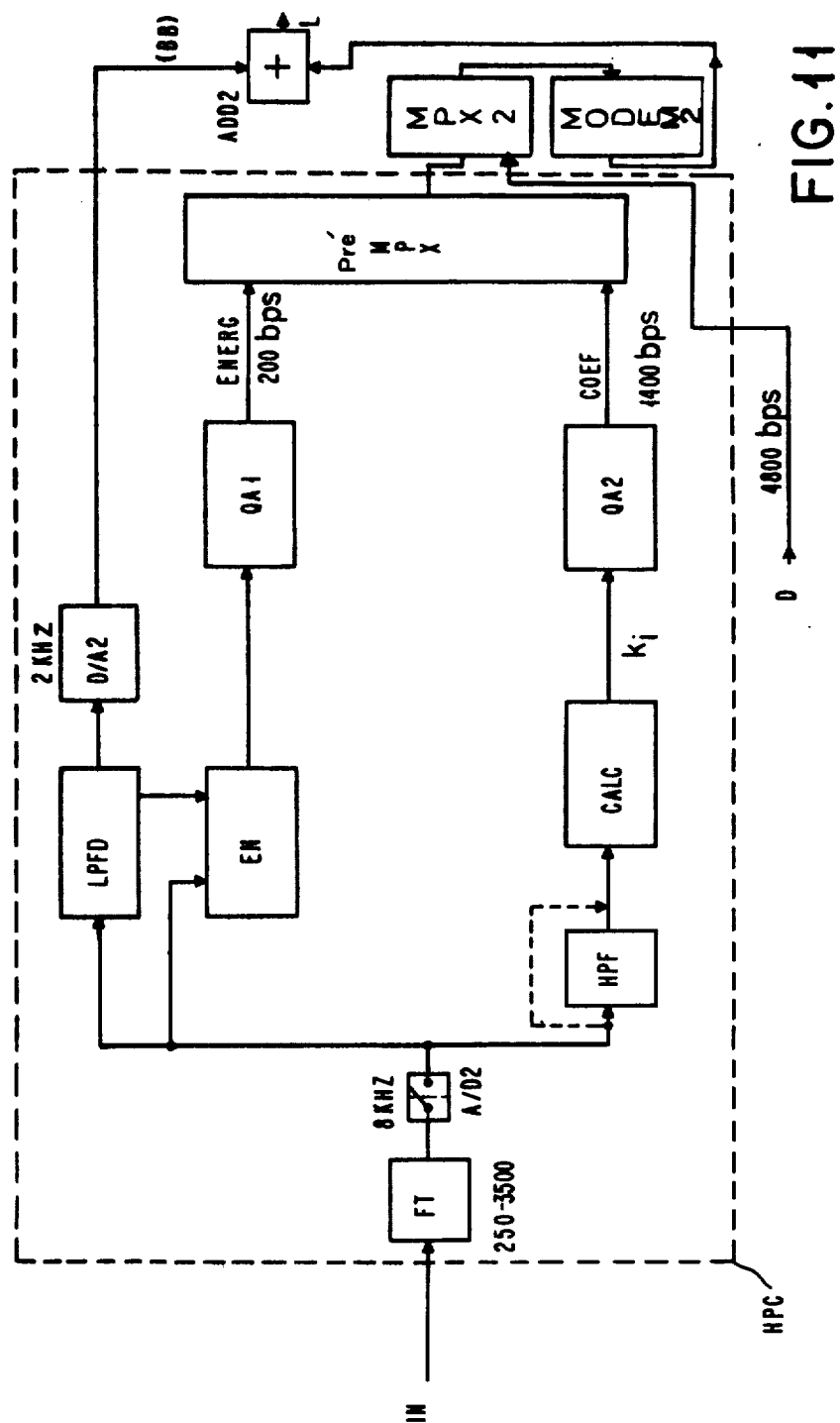
FIGS. 11 and 12 illustrate emitter and receiver diagrams representing another mode of implementing the invention.

FIG. 11 illustrates the emitter device using the coder of FIG. 1 of the U.S. patent mentioned above, said patent being considered as herein incorporated by reference. Said coder has been slightly modified for the purpose of the present invention. All elements already described in the above-mentioned U.S. patent will therefore not be described again. Simply note that the speech-originating signal appearing at the input IN is filtered by filter FT whose bandwidth extends from about 250 to 3500 Hz. The FT output is sampled at 8 KHz in A/D2 to supply the digitally coded samples Sn. The high-frequency part of the spectrum of the signal provided by A/D2 and supplied by a filter HPF is used to calculate (in CALC) eight partial correlation parameters or coefficients $k_i$. When these coefficients $k_i$ have been quantized in QA2, they provide the information COEF. More precisely, it has been chosen to code as a whole the eight coefficients k1 to k8 with 28 bits by using, for example, the technique described in 'Piecewise Linear Quantization of LPC Reflection Coefficients' published by C. Un and S. Yang in Proc. International Conf. on ASSP, Hartford, May 1977.

A quantization method is used assigning more bits to the first coefficients than to the others. For example, the distribution can be as follows:

| | |
|---|---|
| K1 | 5 bits |
| K2 | 5 bits |
| K3 | 3 bits |
| K4 | 3 bits |
| K5 | 3 bits |
| K6 | 3 bits |
| K7 | 3 bits |
| K8 | 3 bits |

This represents a total of 28 bits over 20 ms, that is a rate of:

$$\frac{28}{20 \cdot 10^{-3}} = 1400 \text{ bits per second}$$

Furthermore, the energy of the high-frequency band is measured and normalized with relation to the energy of the base band in EN and quantized in QA1 which provides the data ENERG to which 4 bits are assigned every 20 ms, that is a ratio of 200 bps. A premultiplexer Pre-MPX multiplexes the data COEF and ENERG to obtain a unique bit train at 1600 bps. The data Pre-MPX are multiplexed in MPX(2) with the pure data (D). The output of multiplexer MPX(2) is transmitted to MODEM2.

The MPX(2) and MODEM(2) which are similar in every respect to MPX1 and MODEM1 of FIG. 4, can be combined into one single device i.e the modem IBM 3865 having the characteristics defined above for MODEM1. Futhermore, a low-pass filter LPFD having a band pass between 250 and 750 Hz is connected to the A/D device to isolate the speech signal base band by filtering. The base band signal is converted to analog form by means of a converter D/A2 operating, for example, at 2 KHz. The MODEM(2) and D/A2 outputs are added together in ADD2 whose output is fed to the transmission line L. It is to be noted that the speech signal base band could have been directly extracted from the original analog speech signal, thus saving the converter D/A2.

Figure 12:
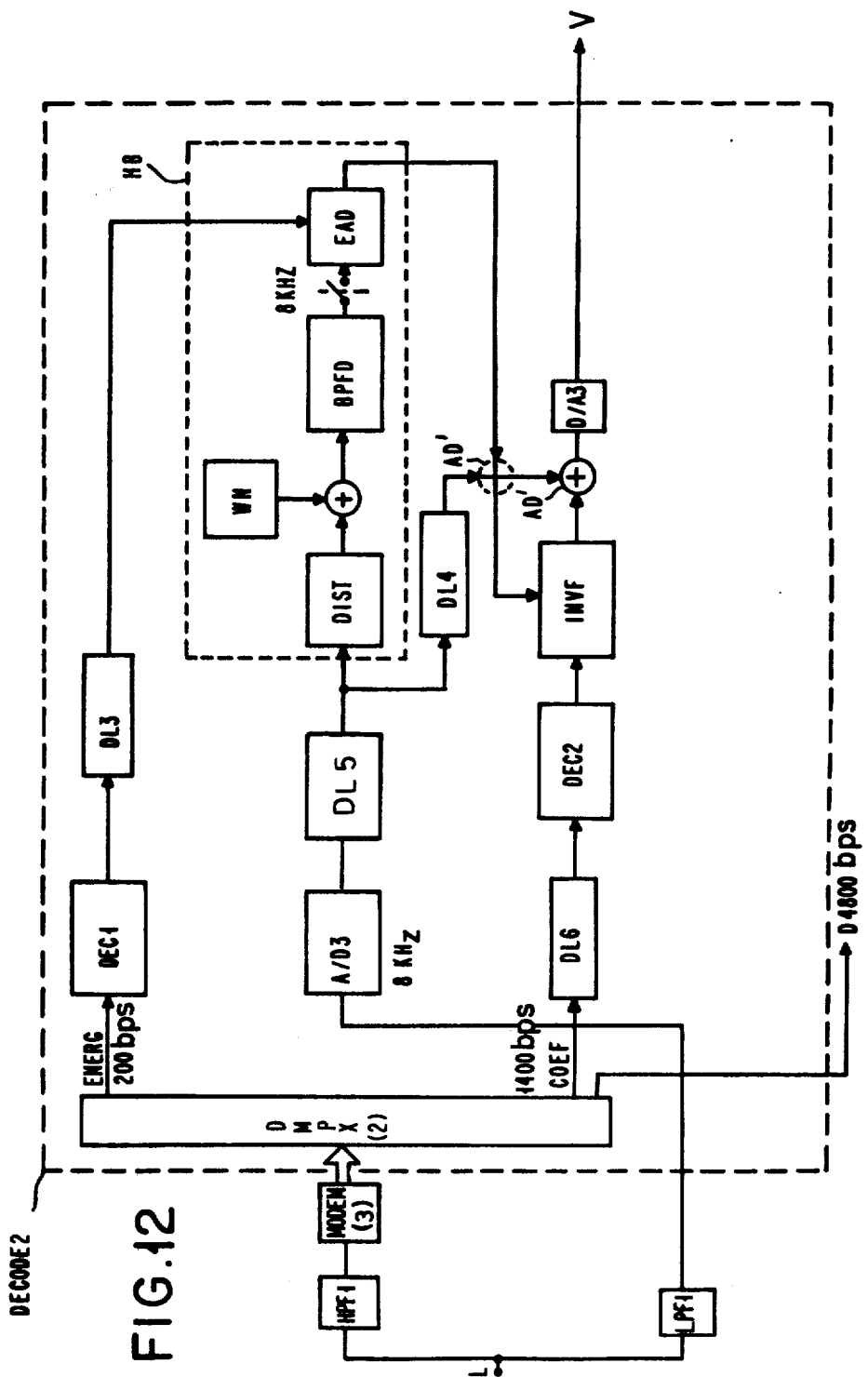

FIG. 12 illustrates the receiver corresponding to the emitter of FIG. 11. This receiver uses the device of FIG. 8 of the above-mentioned U.S. Pat. No. 4,216,354 to which reference is made for a detailed description of the different elements. The transmission line L is connected to a low-pass filter LPF1 and to a high-pass filter HPF1 covering respectively the frequency bandwidth (at 3 dB) from 250 to 750 Hz and from 1200 to 2800 Hz. The HPF1 output signal is demodulated by a MODEM(3) and then demultiplexed by DMPX(2). Demultiplexer DMPX(2) separates the pure data at 4800 bps (sent to the 4800 bps output D) from data ENERG and COEF. Lowpass filer LPF1 provides the data relative to the speech signal base band. This base band is sampled at 8 KHz and digitally coded in A/D3 before being recombined with ENERG and COEF to provide the speech signal. This recombination is performed according to the indications provided by the above-mentioned U.S. Pat. No. 4,216,354. In short, the COEF data are delayed in DL6 and decoded in DEC2 to supply the coefficients of the inverse filter INVF. Furthermore, the path of the signal from A/D3 after being delayed by DL5 is divided into two paths, one direct and one indirect. The indirect path comprises a highband generator HB in which the spectrum of the base band is expanded. This expansion is obtained by nonlinear distortion (in DIST), extraction of the high-frequency band by filtering in BPFD, and modulation in EAD of said high-frequency band by the energy data decoded in DEC1 and supplied through delay element DL3. Besides, since given sounds such as the fricatives yield a very low energy level in the low frequency bandwidth, the energy supplied by a correctly adjusted white noise generator WN (see above-mentioned U.S. patent) is added to the output of DIST. The signal resulting from the combination of the white noise and the information originating from DIST pass through the bandpass filter BPFD having a cutoff frequency at 1000 Hz. The samples of the filtered signal are fed into device EAD which normalizes the level of the highfrequency band with the data provided by DL3. The output of EAD is transmitted to the input of the inverse filter INVF. The base band signal from DL5, is also delayed in DL4 then added in AD' to the data from the inverse filter INVF. The output of AD' is converted into analog form converter in D/A3. Thus, the speech signal is obtained at output V.

Figure 13:
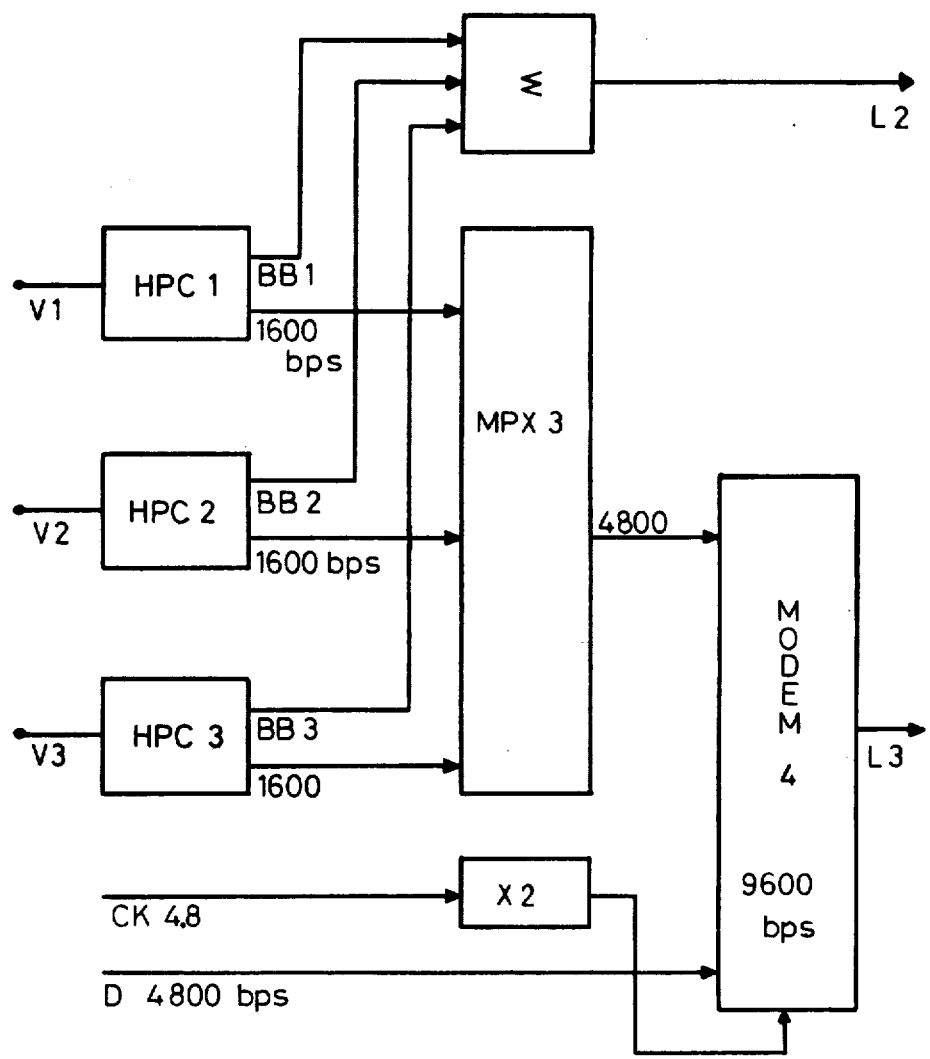
FIG. 13 illustrates a diagram of another mode of implementing the invention (emitter).

The method of the present invention is particularly interesting for reducing the number of telephone lines required for the transmission of speech, or speech and data, in other words, for concentrating voice or voice and data information provided by N sources over a number n<N of telephone lines. For this, it has been decided to regroup and transmit over the same line the base band information (that is, the information designated by BB in FIGS. 4 and 11) of several voices, while the high-band voice information coded at 1600 bps possibly multiplexed with pure data are transmitted over a separate telephone line as shown in FIG. 13.

This figure illustrates a device concentrating the information of three sources V1, V2, and V3 providing speech signals in the telephone frequency bandwidth (250 to 3500 Hz) and signals of a pure data source (D) at 4800 bps over two telephone lines L2 and L3. The speech signals of V1, V2, V3 are processed in HPC1, HPC2, and HPC3 implemented according to the above-mentioned techniques (see items referenced by HPC in FIGS. 4 and 11), to extract therefrom on the one hand the individual analog base bands BB1, BB2 and BB3, and on the other hand the respective characteristics speech parameters (Ei/Eo, or, ki and ENERG) digitally coded at 1600 bps. The three digital channels at 1600 bps are multiplexed in MPX3 over a unique channel at 4800 bps. This unique channel is itself multiplexed with the pure 4800 bps data channel (D) and transmitted by a MODEM4 (clocked by 4.8×2) over a telephone line L3. The multiplexing the two 4800 bps channels at 9600 bps and the modem operations are performed by using the modem IBM 3865.

Figure 14:
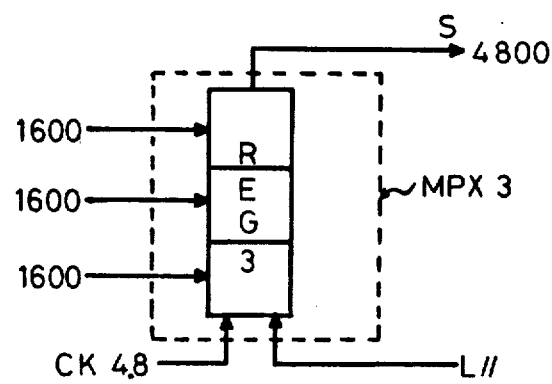
FIGS. 14 to 17 represent diagrams of detailed emitter elements of FIG. 13.
Figure 15:
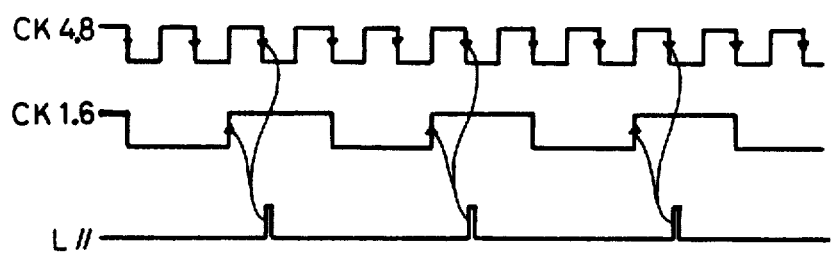

The MPX3 is implemented according to the diagram of FIG. 14. A shift register REG3 serializes at 4800 bps the three channels at 1600 bps each. This register is loaded under control of a clock signal L// at 1600 bps directly derived from clock CK 4.8 KHz by division by three according to the time diagram of FIG. 15. The data at 1600 bps are loaded into REG3 at the leading edge of the clock at 1600 bps. Register REG3 is unloaded at the trailing edge of clock CK 4.8 KHz.

Figure 16:
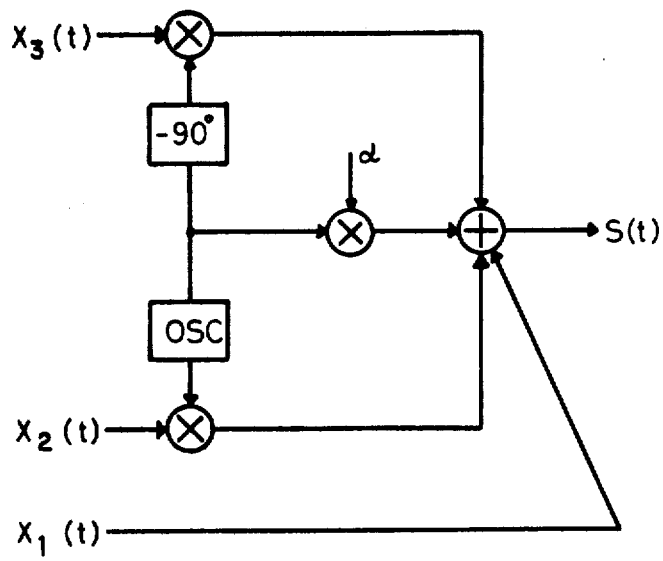

The analog signals of the base bands BB1, BB2 and BB3 are multiplexed in Σ and transmitted over the line L2. Said multiplexing is performed in the frequency domain within the telephone bandwidth 250 to 3500 Hz. This multiplexing operation is performed through signle side band (BLU) amplitude modulation followed by simple addition. In other words, the base bands BB2 and BB3 could be separately modulated in BLU to be transposed respectively into the frequency ranges from about 1000 to 2000 Hz and from 2000 to 3000 Hz, and then the transposed base bands BB2 and BB3 could be added together with BB1 and then be fed to telephone line L2. However, it is also possible to transpose BB2 and BB3 in the frequency range by means of a scheme using 'orthogonal multiplexing' proposed by A. H. Ballard in the publication 'Space and Aeronautics', November 1962 (Orthogonal Multiplexing). The circuit diagram is that of FIG. 16, where the respective signals of BB1, BB2 and BB3 are referenced $x_1(t)$, $x_2(t)$ and $x_3(t)$. The modulation device of FIG. 16 uses an oscillator OSC supplying a carrier wave cos ($\omega_o t$) at 2 KHz. This wave is modulated by $x_2(t)$ and also shifted dephased by 90° before being modulated by $x_3(t)$. The carrier is also modulated by a damping coefficient $\alpha$ to provide a so-called pilote tone $\alpha$ cos $\omega_o t$ in phase with the carrier which is useful at the reception end. The signals are then summed which yields the composite signal:

$$S(t) = x_1(t) + \alpha \cos \omega_o t + x_2(t) \cos \omega_o t + x_3(t) \sin \omega_o t$$

Figure 17:
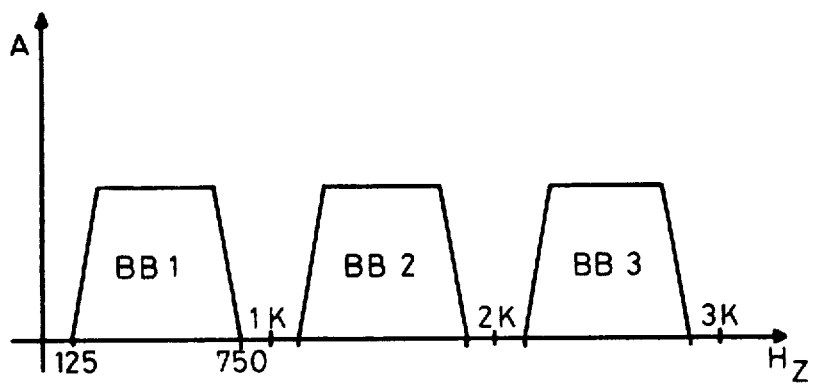

The diagram of the frequency spectrum of S(t) is illustrated in FIG. 17.

Figure 18:
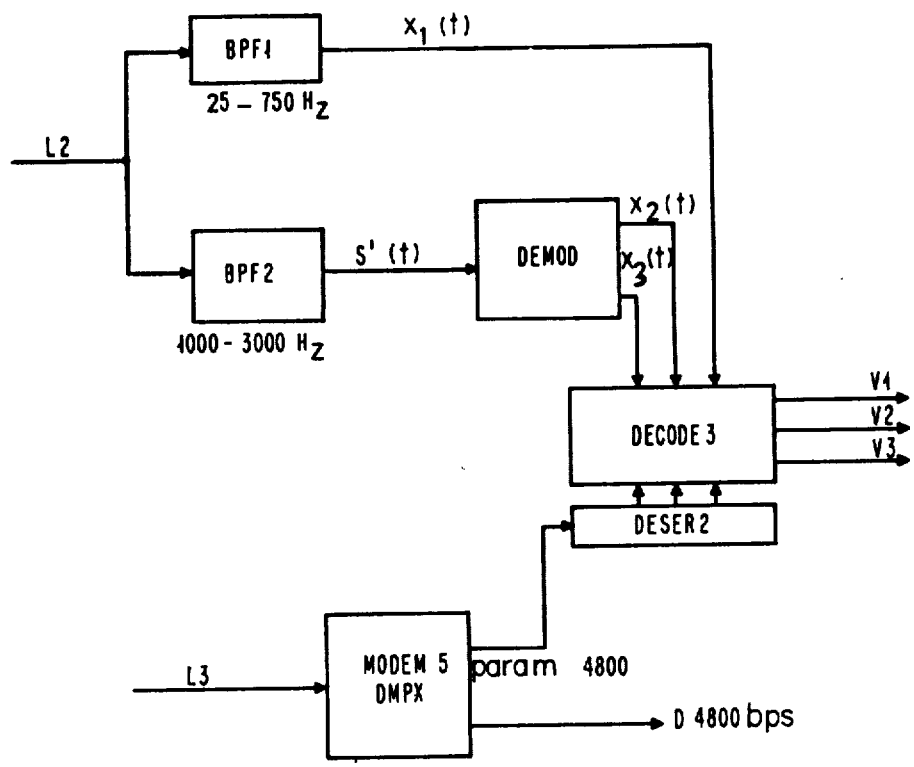
FIG. 18 illustrates the receiver diagram for implementing the invention using the emitter of FIG. 13.

At signal reception (FIG. 18), the signal of line L2 is filtered by means of two bandpass filters BPF1 and BPF2. The first one extracts base band BB1, while the second one extracts the remainder of the received signal, that is:

$$S'(t) = \alpha \cos \omega_o t + x_2(t) \cos \omega_o t + x_3(t) \sin \omega_o t$$

Figure 19:
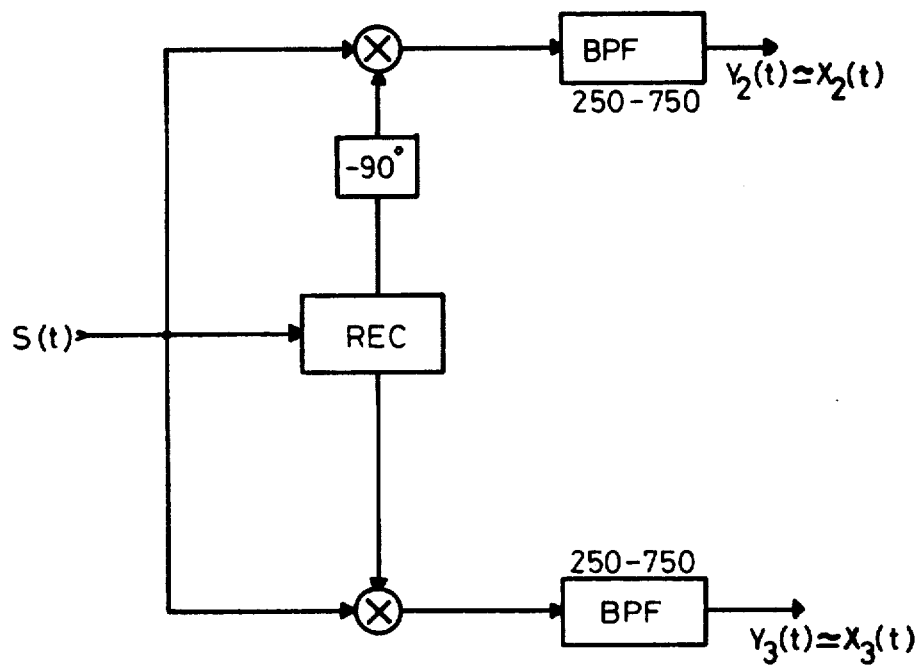
FIG. 19 illustrates the diagram of a receiver circuit of FIG. 18.

The signal S'(t) is processed in DEMOD whose diagram is illustred in FIG. 19. The carrier $\omega_o$ is extracted from signal S(t) by a sharp bandpass filter REC centered at:

$$f_o = \frac{\omega_o}{2\pi}.$$

This carrier used directly as well as after a 90° phase shift to demodulate signal S'(t), supplies $x_2(t)$ and $x_3(t)$ after filtering by filters BPF (bandwidth extending from 250 to 750 Hz). Thus, three base bands BB1, BB2 and BB3 are obtained.

Besides, the signal received on line L3 is demodulated and demultiplexed by means of a modem IBM 3865 separating pure data (D) at 4800 bps from the characteristic parameters (Ei/Eo or $k_i$ and ENERG) which have been multiplexed at 4800 bps. These parameters are deserialized in DESER2 into three channels at 1600 bps. The outputs of DESER2 as well as the base bands BB1, BB2 and BB3 are processed in DECODE(3) issuing the three speech signals V1, V2 and V3. DECODE(3) is formed by three similar, parallel devices of the type designated by DECODE2 in FIGS. 10 and 12. Three delay elements should however be added to DECODE2 as shown in FIGS. 10 and 12 to compensate for the propagation delays between lines L1 and L2.

It will be understood by those skilled in the art that the above method for concentrating three speech channels and one pure data channel over two telephone lines can be generalized so as to concentrate speech signals and possibly pure data originating from a number N of sources on a number n of telephone lines with n<N. For this purpose, a portion of the frequency spectrum of each speech signal should be extracted, and the remainder signal of should be processed to derive therefrom the characteristic parameters of the speech. The base band would be concentrated, for example, by groups of three, over telephone lines, and the parameters would be multiplexed together (for example by groups of six), or multiplexed with pure data and transmitted over telephone lines after being submitted to modulating operations.

While the invention has been particularly shown and described with reference to a preferred embodiment thereof, it will be understood by those skilled in the art that numerous changes in form and details may be made therein without departing from the spirit and scope of this invention.

We claim:

1. A transmission method for simultaneously transmitting voice signals covering a given frequency bandwidth and pure data provided by digital terminals over the same telephone line, said method including:
   processing the voice signals for extracting a low frequency band analog signal, i.e., a base band signal and characteristic voice parameters therefrom;
   digitally coding said characteristic voice parameters;
   multiplexing said pure data with said digitally coded characteristic parameters;
   converting the multiplexed data into analog signal(s);
   adding said analog converted signal(s) to said analog base band; and
   transmitting said added signal(s) over the telephone line(s).

2. A transmission method according to claim 1, wherein said extraction of so-called characteristic speech parameters is performed according to the so-called base band vocoder techniques and includes:
   filtering the speech signal into several subbands whose juxtaposition covers the high-frequency bandwidth of the speech signal; and,
   measuring energy information from the signal contained in each of said subbands to derive said characteristic speech parameters therefrom.

3. A transmission method according to claim 2, wherein said energy measurement is performed on speech signal segments of predetermined duration.

4. A transmission method according to claim 3, wherein said energy contained in each subband is normalized with respect to the energy contained in the base band.

5. A transmission method according to claim 1, wherein said extraction of the characteristic speech parameters is performed according to the so-called predictive vocoder techniques including:
   measuring an information ENERG relative to the energy of the high-frequency bandwidth of the speech signal;
   digitally coding said information ENERG;
   extracting from said speech signal an information COEF representing digitally coded partial correlation coefficients; and,
   multiplexing said digitally coded ENERG and COEF into a single bit train, wherein said bit train is representative of said characteristic speech parameters.

6. A transmission method according to any one of claims 1 to 5, wherein said conversion of the multiplexed data into an analog signal is performed by modulation.

7. A transmission method wherein information provided by N voice sources are concentrated over n telephone lines with n less than N, said method including the operations of:
   filtering the speech signals provided by said voice sources for individually extracting so-called low frequency analog base band signals therefrom;
   extracting from each of said speech signals so-called characteristic speech parameters and digitally coding said parameters;
   grouping the various base band signals into predetermined groups;
   adding together the base band signals within each of said groups and transmitting the added base band signals over a first same telephone line;
   grouping the characteristic speech parameters into predetermined groups;
   multiplexing together the parameters of the same group;
   submitting the multiplexed parameters of each group to modulation operation; and,
   transmitting the signal resulting from said modulation over a second same telephone line.

8. A method according to claim 7, wherein said extraction of the characteristic speech parameters is performed according to the so-called base band vocoder techniques and includes:
   filtering the speech signal into several subbands whose juxtaposition covers the speech high-frequency bandwidth; and,
   measuring the energy contained in each of said subbands to derive the characteristic speech parameters therefrom.

9. A method according to claim 8, wherein said energy measurement is performed over speech signal segments of predetermined duration.

10. A method according to claim 9, wherein the energy of the signal contained in each of the subbands is normalized with respect to the energy contained in the corresponding base band.

11. A method according to claim 7, wherein said characteristic speech parameters extraction is performed according to the so-called predictive vocoder techniques including:
    extracting from each speech signal an information ENERG relative to the energy of the high-frequency bandwidth of said speech signal;
    digitally coding said information ENERG;
    extracting from each speech signal an information COEF representing digitally coded partial correlation coefficients; and,
    multiplexing said digitally coded ENERG and COEF into aa single bit train.

12. A method according to any one of claims 7 to 11, wherein said base band signal grouping includes:
    submitting at least one of said base band signals to a single side band modulation operation; and,
    adding together the base bands belonging to a same group.

13. A device for transmitting voice signals and pure data provided by digital terminals over the same telephone line, including:
    filtering means fed with said voice signals and deriving therefrom a so-called base band analog information and high-frequency sub-bands information;
    energy measuring means responsive to said filtering means for deriving energy information relative to the energies contained within said base band and within each of said subbands;
    energy normalizing means responsive to said energy measuring means for normalizing said subband energies to the base band energy;
    coding means responsive to said normalizing means for digitally coding said normalized energies and deriving characteristic speech parameters therefrom;
    multiplexing means connected to said coding means and to at least one source of pure data;
    modulating means connected to said multiplexing means, and,
    adding means responsive to said filtering means and to said modulating means for adding said base band information to the signal supplied by said modulating means, and for feeding said telephone line.

* * * * *